3,297,462
PROCESS FOR RENDERING ORGANIC POLYMERIC SHAPED STRUCTURE RESISTANT TO DEGRADATION BY ULTRAVIOLET LIGHT
Herbert H. Fanning, Columbus, Ohio, assignor to E. I. du Pont de Nemours and Company, Wilmington, Del., a corporation of Delaware
No Drawing. Filed Sept. 10, 1963, Ser. No. 307,784
8 Claims. (Cl. 117—33.3)

This invention relates to organic polymeric films resistant to degradation when exposed to sunlight, and more particularly to an improved process for rendering polymeric films resistant to the deteriorating influence of sunlight.

It is well known that certain organic polymeric structures such as polyethylene terephthalate, polyoxymethylene, polyvinyl fluoride, polyamide, when subjected to sunlight, deteriorate rapidly. The ultraviolet rays present in the sunlight tend to embrittle the structures and reduce the level of their physical properties substantially.

The resistance of these structures to the deleterious effect of ultraviolet light can be markedly improved by screening out the harmful wave lengths of ultraviolet light by means of certain benzophenone derivatives penetrated into and concentrated at the surface of the structure, as described and claimed in U.S. Patent 3,043,709, issued to L. E. Amborski. In accordance with this patent the benzophenone derivative, in metered amounts, is first applied to the surface of an organic polymeric shaped structure, e.g., film, by any convenient expedient, and the film is thereafter heated to a temperature above the melting point of the benzophenone derivative and below the melting point of said organic polymeric film and for a time sufficient to cause substantially all of the substituted benzophenone to penetrate the film to a depth not more than 20% of the thickness of the film.

An object of this invention is to provide an improved process for incorporating in a thermoplastic organic polymeric structure, by surface penetration, effective amounts of a benzophenone derivative ultraviolet light absorbent. Another object is to provide a process for the rapid and direct penetration of ultraviolet light absorbent in the surface of a thermoplastic organic polymeric film so that the absorbent is concentrated in and at the surface of the film. Still another object is to provide an economical, commercially attractive process for directly and rapidly penetrating both surfaces of thermoplastic organic polymeric film simultaneously with an ultraviolet light absorbent. A more specific object is to provide an improved process for the direct and rapid penetration of predetermined amounts of ultraviolet light absorbent, in one or both surfaces of a film of polyethylene terephthalate film. The foregoing and related objects will more clearly appear from the description which follows.

These objects are accomplished by the present invention which, briefly stated, comprises, in combination, the sequential steps of (1) immersing a thermoplastic organic polymeric shaped structure, e.g., film, having a zero strength temperature of at least 200° C., in a solution maintained at a temperature within the range of from about 130° to about 170° C., and comprising essentially at least 10% by weight based on the total weight of the solution, of a benzophenone derivative selected from the group consisting of 2,3-dihydroxy-4,4' - dimethoxy benzophenone and 2,2' - dihydroxy-4-methoxy benzophenone, dissolved in a solvent mixture consisting of diethylene glycol and glycerol, the weight ratio of diethylene glycol/glycerol being within the range of from 75/25 to 40/60, for a sufficient length of time to absorb into the surface of the structure at least 0.8 gram of benzophenone derivative per square meter of treated surface; (2) immersing said structure in a bath of diethylene glycol maintained at a temperature within the range of about 65° to about 95° C.; (3) washing said structure in water to remove solvent; and (4) thereafter drying said structure.

The crux of the present invention lies in the use of a diethylene glycol/glycerol mixture as a medium for penetrating the benzophenone derivative into the surface of the film. It has been found that when a mixture of these two solvents in the proportions specified in the process of the present invention are utilized, the proper total concentration of the ultraviolet light absorbent is penetrated to the requisite degree into the surface of the structure (i.e., no greater than 20% of the thickness adjacent to each surface as described in U.S. Patent 3,043,709) under the conditions of time and temperature which are acceptable for commercial operation. Although the mechanism of this reaction is not fully understood, it is believed that the rate of penetration of the ultraviolet light absorbent compound into the base film is governed by the degree of solubility of the absorbent in the diethylene glycol/glycerol mixture. It has been found that the better the solubility of the absorbent in the solvent bath mixture the poorer the rate of penetration. By utilizing a solution which is saturated as respects the ultraviolet light absorbent but which contains the desired concentration of absorbent to be penetrated into the film surface, the dissolved absorbent seeks to leave the solvent and appears to preferentially seek out the structure undergoing treatment. If the solvent mixture contains in excess of about 75 parts by weight of diethylene glycol per 100 parts of solvent mixture the rate of penetration of the ultraviolet light absorbent dissolved therein will be so low as to be generally unacceptable in commercial application of the process, even at maximum solution temperatures. On the other hand, if the mixture contains less than about 40 parts of diethylene glycol the necessary minimum concentration of ultraviolet light absorbent per unit surface area of treated polymeric structure will not be realized. The preferred weight ratio of diethylene glycol to glycerol is 55/45.

The concentration of ultraviolet light absorbent in solution should be not less than about 10% by weight, based on the total weight of solution, in order to secure penetration of at least 0.8 gram per square meter of treated surface. A concentration of 20% of benzophenone derivative in a 55/45 diethylene glycol/glycerol solvent mixture is preferred. No particular advantage is to be derived by penetrating into the treated polymeric structure amounts of ultraviolet light absorbent in excess of about 1 gram per square meter of treated surface.

The penetration temperature, i.e., the temperature at which the solution of ultraviolet light absorbent is maintained in use, may range from 130° C. to 170° C., although preferred temperatures are 150°–160° C. Immersion times necessary to obtain the required penetration and protection varies, of course, with the solvent mixture, absorbent concentration, and temperature of solution. For example with a 20% by weight 2,2′-dihydroxy-4,4′-dimethoxy benzophenone diethylene glycol/glycerol (55/45% by weight) system, 1.7 g./m.$^2$ the absorbent will penetrate to the extent of 0.85 gram per square meter of treated surface in 18 seconds at 140° C., 10 seconds at 150° C., and 5 seconds at 160° C.

Because of the inability of water to wash the penetrated polymeric shaped structure clear of residual absorbent bath without incurring an objectionable hazy appearance, the step of immersing the structure, after it has been subjected to the penetrating step in the solvent bath containing the ultraviolet light absorbent, in a solvent wash bath containing diethylene glycol at a temperature less than that used in the penetration step is necessary. The excess ultraviolet light absorbent is removed and the remaining solvent is then washed easily by passing the structure through a water bath before drying and wind-up. The temperature of the solvent wash has been found to be critical. Temperatures above 65° C. are required to effect satisfactory removal of residual absorbent; the higher the temperature, the faster the removal. However, undesirable leaching of the penetrated absorbent will occur at temperatures above about 95° C., hence a solvent wash bath temperature of 80° C. is to be the preferred.

The process of the present invention is applicable to any thermoplastic, organic, polymeric shaped structures, e.g. continuous film, sheet materials, and molded articles of thermoplastic organic polymeric materials, which possess the ability to withstand subjection to temperatures up to 180° C. for short periods of time without appreciable shrinkage (i.e. greater than 10%) or evidences of degradation. It has been found that thermoplastic organic polymeric materials which possess zero strength temperatures of at least 200° C. may be satisfactorily treated by the process of the present invention. Zero strength temperature is defined as that temperature at which a material, e.g. a film, supports a load of 20 lbs./in.$^2$ of material cross-sectional area for no more nor less than 5±0.5 seconds. The test is carried out by placing the sample to be tested in contact with a heated bar, the proper load being previously applied, and determining the length of time required for failure. This is carried out at various temperatures until the zero strength temperature is determined. Examples of polymeric materials which possess the requisite zero strength characteristics are oriented polyethylene terephthalate, polyvinyl fluoride, polyacrylonitrile, polyoxymethylene, polytrifluoroethylene, certain oriented polyamides such as polyhexamethyl adipamide, polytetrafluoroethylene, polychlorotrifluoroethylene, and copolymers of tetrafluoroethylene and hexafluoropropylene. Because of the commercial importance and widespread use of polyethylene terephthalate film in outdoor applications the process of this invention will be hereinafter described with specific reference to the treatment of polyethylene terephthalate film, and more particularly to the treatment of biaxially oriented, heat-set polyethylene terephthalate film.

The following examples will serve to more clearly illustrate the principles, practice, and advantages of this invention.

*Example 1*

Polyethylene terephthalate film was oriented by stretching in two directions to three times (3×) its original dimensions. The oriented film was then heat-set by heating at a temperature of 220±5° C. while holding the film under tension. The final thickness of the film was 5 mils (.005 inch). The resulting oriented heat-set film was immersed for 11 seconds in a penetrating bath by passing the film through a tank containing 20% 2,2′-dihydroxy-4,4′-dimethoxybenzophenone dissolved in a 55/45% by weight diethylene glycol/glycerol solvent mixture maintained at a temperature of 150° C. After passing through the penetrating bath excess solution was removed by wiping blades positioned above the liquid level in the tank. The film was then passed through a solvent wash tank containing diethylene glycol maintained at a temperature of 80° C. The total immersion time in the solvent wash tank was 11 seconds. After immersion in the solvent wash bath, the film was passed through a water spray system wherein the film was thoroughly sprayed with water at 60° C. After excess water had been removed by passing the film between wiper blades, the film was dried in a radiant heat drier at a temperature of 150° C. Analysis of the dried coated film shown that a total of 1.8 g./m.$^2$ (0.9 g./m.$^2$ per side) of the substituted benzophenone derivative was retained by the film. Further tests show that the 2,2′-dihydroxy-4,4′-dimethoxybenzophenone had been penetrated into the surfaces of the film to no greater than 20% of the thickness adjacent to each surface.

*Example 2*

The following films:

(a) Polyethylene terephthalate — bidirectionally oriented—5 mils thick. Zero strength temp.—230° C.
(b) Polyvinyl fluoride—bidirectionally oriented—4 mils thick. Zero strength temp.—300° C.
(c) Polyvinyl chloride—4 mils thick. Zero strength temp.—132° C.
(d) Cellophane—3 mils thick. Zero strength temp.—infusible.
(e) Cellulose acetate—1 mil thick. Zero strength temp.—184° C.
(f) Polyethylene—2 mils thick. Zero strength temp.—135° C.

were subjected to penetration by 2,2′-dihydroxy-4,4′-dimethoxybenzophenone ("Uvinul" D–49; Antara Chemical Division of General Aniline & Film Corp.) from a 20% solution of "Uvinul" D–49 in a 55/45 diethylene glycol/glycerol mixture maintained at 140° C., following the procedure described in Example 1. After immersion the films were washed in a diethylene glycol bath at 80° C., followed by a water wash, and dried at 150° C. Of the films treated only the polyethylene terephthalate and polyvinyl fluoride films (zero strengths >200° C.) were unaffected by the temperature of the solutions. The cellulose acetate, polyethylene, and cellophane films (zero strengths <200° C.) shrank badly and were unusable. The polyvinyl chloride film (zero strength <200° C.) produced hazy samples due to softening.

*Example 3*

Samples of biaxially oriented heat-set polyethylene terephthalate film (Example 1), 5 mils thick, and biaxially oriented polyvinyl fluoride film, 4 mils thick, were penetrated separately with:

(a) 2,2′ - dihydroxy - 4,4′-dimethoxy benzophenone ("Uvinul" D–49)
(b) A mixture of 2,2′-dihydroxy-4,4′-dimethoxy benzophenone and other tetra substituted benzophenones ("Uvinul" 490)
(c) 2,2′-4,4′-tetrahydroxy benzophenone ("Uvinul" D–50)

The solutions containing a 20% by weight concentration of the absorbent dissolved in a 55/45 by weight diethylene glycol/glycerol mixture were maintained at a temperature of 140° C. A sample of each film was immersed in the absorbent-solvent bath for 5, 10, 20 and 30 seconds respectively. After immersion the films were washed in a diethylene glycol bath at 80° C., followed by a water wash. The films were then dried at 150° C. The amount of absorber penetrated into the films were measured by means of a "Spectronic 20" (Bausch & Lomb) colorimeter.

Table I below shows the degree of penetration obtained in each instance.

to the films was measured by means of a "Spectronic 20" (Bausch & Lomb) colorimeter.

TABLE I

| Ultraviolet Light Absorbent | Immersion Time (Sec.) | Absorbent Penetrated (g./m.²) (Both Sides) | |
|---|---|---|---|
| | | Polyethylene Terephthalate | Polyvinyl Fluoride |
| 2,2'-dihydroxy-4,4'-dimethoxy benzophenone ("Uvinul" D-49) | 5 | 0.75 | 0.72 |
| Do | 10 | 1.21 | 1.04 |
| Do | 20 | 1.80 | 1.57 |
| Do | 30 | 2.20 | 1.96 |
| Mixture of 2,2'-dihydroxy-4,4'-dimethoxy benzophenone and other tetra substituted benzophenones ("Uvinul" 490) | 5 | 0.29 | 0.21 |
| Do | 10 | 0.40 | 0.31 |
| Do | 20 | 0.54 | 0.41 |
| Do | 30 | 0.74 | 0.52 |
| 2,2'-4,4'-tetrahydroxy benzophenone | 5 | 0.07 | 0.02 |
| Do | 10 | 0.09 | 0.04 |
| Do | 20 | 0.12 | 0.045 |
| Do | 30 | 0.15 | 0.5 |

As can be seen from the above table, only the 2,2'-dihydroxy-4,4'-dimethoxy benzophenone was penetrated into the surfaces of the test films in sufficient concentrations within feasible immersion times.

*Example 3*

Utilizing the procedure described in Example 1, samples of polyethylene terephthalate film—bidirectionally oriented—5 mils thick were subjected to penetration with 2,2'-dihydroxy-4-methoxy benzophenone ("Cyasorb" UV-24—American Cyanamid Co.).

The solutions containing a 20% by weight concentration of the absorbent dissolved in a solvent mixture of 55% diethylene glycol and 45% glycerol were maintained at temperatures of 140 and 150° C. respectively for periods of time ranging from 5 to 30 seconds. After immersion the films were washed in a diethylene glycol bath at 80° C., and thereafter in water. The films were then dried at 150° C. The amount of absorbent penetrated into the films was measured by means of a "Spectronic 20" (Bausch & Lomb) colorimeter.

The table below illustrates the degree of penetration of the absorbent within the various immersion times at the given temperatures into the polyethylene terephthalate film samples.

TABLE II

| Temperature (° C.) | Immersion Time (Sec.) | Absorbent Penetrated (g./m²) (Both Sides) |
|---|---|---|
| 140 | 5 | 0.60 |
| 140 | 10 | 0.98 |
| 140 | 20 | 1.50 |
| 140 | 30 | 1.96 |
| 150 | 5 | 1.00 |
| 150 | 10 | 1.45 |
| 150 | 20 | 2.10 |
| 150 | 30 | 2.56 |

*Example 4*

Bidirectionally oriented polyethylene terephthalate (5 mils in thickness) was treated with a 20% concentration

TABLE III

| Type Film | Exposure, Hours | Percent Elongation | Physical Property Data | | | Appearance |
|---|---|---|---|---|---|---|
| | | | Tensile Strength (Break), p.s.i.×10⁻³ | Modulus, p.s.i.×10⁻³ | Strength at 3% Elongation, p.s.i.×10⁻³ | |
| I. Accelerated Weathering test ("Atlas" Model XW Weatherometer): | | | | | | |
| A. Polyethylene terephthalate penetrated with 1.6 g./m.² 2,2'-dihydroxy-4,4'-dimethoxybenzophenone. | 0 | 164 | 20 | 593 | 13 | Clear-tough. |
| | 250 | 166 | 20 | 544 | 14 | Do. |
| | 500 | 157 | 19 | 568 | 14 | Do. |
| | 750 | 139 | 23 | 629 | 14 | Do. |
| | 1,000 | 118 | 23 | 624 | 15 | Do. |
| | 1,250 | 101 | 21 | 628 | 14 | Do. |
| | 1,500 | 124 | 22 | 672 | 15 | Do. |
| | 1,750 | 96 | 19 | 617 | 14 | Do. |
| | 2,250 | 126 | 22 | 639 | 15 | Do. |
| | 2,500 | 93 | 21 | 644 | 15 | Do. |
| B. Untreated (control) polyethylene terephthalate film. | 0 | 177 | 25 | 618 | 15 | Do. |
| | 250 | 16 | 13 | 567 | 14 | Do. |
| | 500 | 3 | 12 | 642 | | Clear-brittle. |
| | 750 | | | | | |
| | 1,000 | | | | | |
| | 1,250 | | | | | |
| | | | Deteriorated | | | |
| | 1,500 | | | | | |
| | 1,750 | | | | | |
| | 2,000 | | | | | |
| | 2,250 | | | | | |
| | 2,500 | | | | | |
| II. Natural (Florida) Exposure: | | | | | | |
| C. Polyethylene terephthalate penetrated with 1.6 g./m.² 2,2'-dihydroxy-4,4'-dimethoxybenzophenone. | 0 | 158 | 25 | 547 | | Clear-tough. |
| | 3 | 141 | 23 | 556 | | Do. |
| | 6 | 134 | 21 | 584 | | Do. |
| | 9 | 130 | 23 | 627 | | Do. |
| | 12 | 142 | 23 | 578 | | Do. |
| D. Untreated (control) polyethylene terephthalate film. | 0 | 133 | 30 | | | Do. |
| | 3 | 5 | 16 | | | Clear-brittle. |
| | 6 | 0 | 0 | | | Deteriorated. |
| | 0 | | | | | Do. | of 2,2'-dihydroxy-4,4'-dimethoxy benzophenone dissolved in a 55/45% by weight solution of diethylene glycol/glycerol in accordance with Example 1. 1.6 g./m.$^2$ (0.8 g./m.$^2$ per side) of the absorbent was penetrated into the film surfaces as shown by analysis made with the "Spectronic 20" colorimeter. Samples of the treated film and untreated (control) film were subjected to (a) the action of an "Atlas" Model XW Sunshine Arc Weatherometer and (b) to Florida sunligha for 3–12 months. The physical properties of the film samples were measured and are recorded in Table III. Listed are the number of hours exposure, percent elongation, tensile strength at break, modulus, and strength measured at 3% elongation.

As can be seen from the table, the films treated in accordance with the process outlined above, remain tough and clear after prolonged exposure to ultraviolet light. In contrast, the untreated (control) film deteriorated in a very short time becoming brittle and completely unusable.

It will be evident from the foregoing description and examples that the process of the present invention provides for a highly satisfactory, rapid, and economical method of penetrating the ultraviolet light absorbents into the surface of organic polymeric structures. Since it allows for the predetermined desired penetration of the absorbent into the surface structure, it eliminates the need for a two-step system of (1) metering the absorbent onto the surface structure and (2) thereafter penetrating the absorbent into said surface by the application of heat. By elimination of these two separate steps, the need for accurate coating weight measurement and adjustment, and high investment costs of dispersion coating tower equipment are eliminated. As a consequence productivity is increased manyfold, and the cost of manufacturing weatherable structures is materially lowered.

I claim:

1. A process for imparting resistance to degradation by ultraviolet light to a thermoplastic organic polymeric shaped structure which comprises, in combination, the sequential steps of (1) immersing a thermoplastic organic polymeric shaped structure having a zero strength temperature of at least 200° C. in a solution maintained at a temperature within the range of from about 130° to about 170° C., and comprising at least 10% by weight, based on the total weight of the solution, of a benzophenone derivative compound selected from the group consisting of 2,2'-dihydroxy-4,4'-dimethoxy benzophenone and 2,2'-dihydroxy-4-methoxy benzophenone, dissolved in a solvent mixture consisting of diethylene glycol and glycerol, the weight ratio of diethylene glycol/glycerol being within the range of from 75/25 to 40/60, for a sufficient length of time to absorb into the surface of said structure at least 0.8 gram of benzophenone derivative per square meter of treated surface; (2) washing said structure in a bath of diethylene glycol maintained at a temperature within the range of from about 65° to about 95° C.; (3) further washing said structure in water to remove solvent; and (4) drying said structure.

2. The process of claim 1 wherein said solution is maintained at a temperature of from 150° to 160° C.

3. The process of claim 1 wherein the weight ratio of diethylene glycol/glycerol is 55/45.

4. The process of claim 3 wherein the solution contains about 20% by weight of benzophenone derivative.

5. The process of claim 1 wherein said bath of diethylene glycol is maintained at about 80° C.

6. A process for imparting resistance to degradation by ultraviolet light to polyethylene terephthalate film which comprises, in combination, the sequential steps of (1) immersing polyethylene terephthalate film in a solution maintained at a temperature within the range of from about 130° to about 170° C., and comprising at least 10% by weight of a benzophenone derivative compound selected from the group consisting of 2,2'-dihydroxy-4,4'-dimethoxy benzophenone, and 2,2'-dihydroxy-4-methoxy benzophenone, dissolved in a solvent mixture consisting of diethylene glycol and glycerol, the weight ratio of diethylene glycol/glycerol being within the range of from 75/25 to 40/60, for a sufficient length of time to absorb into the surfaces of said film at least 0.8 gram per square meter of film surface; (2) washing said film in a bath of diethylene glycol maintained at a temperature within the range of from about 65° to about 95° C.; (3) washing said film in water to remove solvent; and (4) drying said film.

7. The process of claim 6 wherein said film is biaxially oriented, heat-set polyethylene terephthalate film.

8. A process for imparting resistance to degradation by ultraviolet light to polyethylene terephthalate film which comprises, in combination, the sequential steps of (1) immersing biaxially oriented, heat-set polyethylene terephthalate film in a solution maintained at a temperature of from 150° to 160° C., and comprising about 20% by weight of 2,2'-dihydroxy-4,4'-dimethoxy benzophenone dissolved in a solvent mixture consisting of diethylene glycol and glycerol in the weight ratio of 55/45, for a sufficient length of time to absorb into the surface of said film at least 0.8 gram per square meter of film surface; (2) washing said film in a bath of diethylene glycol maintained at a temperature of about 80° C.; (3) washing said film in water to remove solvent; and (4) drying said film.

References Cited by the Examiner

UNITED STATES PATENTS 2,364,112  12/1944  Van Every _____ 117—33.3 X
3,043,709  7/1962  Amborski _____ 117—7

WILLIAM D. MARTIN, *Primary Examiner.*

T. G. DAVIS, *Assistant Examiner.*